US011734440B2

(12) United States Patent
Swaine

(10) Patent No.: US 11,734,440 B2
(45) Date of Patent: Aug. 22, 2023

(54) MEMORY ACCESS TRANSACTION WITH SECURITY CHECK INDICATION

(71) Applicant: Arm Limited, Cambridge (GB)

(72) Inventor: Andrew Brookfield Swaine, Sheffield (GB)

(73) Assignee: Arm Limited, Cambridge (GB)

( * ) Notice: Subject to any disclaimer, the term of this patent is extended or adjusted under 35 U.S.C. 154(b) by 912 days.

(21) Appl. No.: 16/564,282

(22) Filed: Sep. 9, 2019

(65) Prior Publication Data

US 2021/0073403 A1 Mar. 11, 2021

(51) Int. Cl.
*G06F 21/62* (2013.01)
*G06F 3/06* (2006.01)

(52) U.S. Cl.
CPC ........ *G06F 21/6218* (2013.01); *G06F 3/0622* (2013.01); *G06F 3/0659* (2013.01); *G06F 3/0673* (2013.01)

(58) Field of Classification Search
CPC .. G06F 21/6218; G06F 3/0622; G06F 3/0659; G06F 3/0673; G06F 21/62
See application file for complete search history.

(56) References Cited

U.S. PATENT DOCUMENTS

| 8,209,510 B1* | 6/2012 | Thathapudi | G06F 21/60 711/171 |
| 2004/0177261 A1* | 9/2004 | Watt | G06F 12/1491 711/E12.1 |
| 2006/0036823 A1 | 2/2006 | Mathews et al. | |
| 2012/0036299 A1 | 2/2012 | Renno | |
| 2015/0371017 A1 | 12/2015 | Craske et al. | |
| 2016/0110298 A1 | 4/2016 | Koufaty et al. | |
| 2018/0203610 A1* | 7/2018 | Krueger | G06F 3/0685 |
| 2018/0218150 A1* | 8/2018 | Angelino | G06F 21/70 |
| 2018/0268170 A1 | 9/2018 | Li et al. | |

OTHER PUBLICATIONS

International Search Report and Written Opinion of the International Searching Authority for PCT/GB2020/051520, dated Sep. 1, 2020, 16 pages.

* cited by examiner

*Primary Examiner* — Jung W Kim
*Assistant Examiner* — Howard H. Louie
(74) *Attorney, Agent, or Firm* — Nixon & Vanderhye P.C.

(57) ABSTRACT

A memory system component comprises transaction handling circuitry to receive memory access transactions. Each memory access transaction specifies at least: an issuing domain identifier which indicates an issuing security domain specified by an issuing master device for the memory access transaction, where the issuing security domain is one of a plurality of security domains; a target address; and a security check indication which indicates whether it is already known that the memory access transaction would pass a security checking procedure. The security checking procedure determines whether the memory access transaction indicating said issuing security domain is authorised to access the target address, based on control data indicative of which of the plurality of security domains are allowed to access the target address. The memory system component comprises control circuitry to determine, on the basis of the security check indication, whether the security checking procedure still needs to be performed.

18 Claims, 13 Drawing Sheets

| | | Transaction Security Check Indication | |
|---|---|---|---|
| | | Unknown | Positive |
| Cache Entry Check Indicator | Unknown | Perform security checking procedure Update cache if pass, signal error if fail | Do not perform security checking procedure Update cache to positive check indication |
| | Positive | Do not perform security checking procedure Update transaction with positive security check indication | Do not perform security checking procedure |

FIG. 12B

MEMORY ACCESS TRANSACTION WITH SECURITY CHECK INDICATION

BACKGROUND

Technical Field

The present technique relates to the field of data processing. More particularly, it relates to memory access control.

Technical Background

In some systems a processor or other device can operate in either a secure domain or non-secure domain. Control over access to memory may be dependent on the security domain that the processor is operating in.

SUMMARY

At least some examples provide a memory system component comprising:

transaction handling circuitry to receive memory access transactions, each memory access transaction specifying at least:

an issuing domain identifier which indicates an issuing security domain specified by an issuing master device for the memory access transaction, where the issuing security domain is one of a plurality of security domains;

a target address; and a security check indication which indicates whether it is already known that the memory access transaction would pass a security checking procedure;

where said security checking procedure is for determining whether the memory access transaction indicating said issuing security domain is authorised to access the target address, based on control data indicative of which of the security domains are allowed to access the target address; and the memory system component comprises control circuitry to determine, on the basis of the security check indication, whether the security checking procedure still needs to be performed.

At least some examples provide a master device comprising:

transaction issuing circuitry to issue memory access transactions; and encoding circuitry to encode each memory access transaction with an encoding specifying at least:

an issuing domain identifier which indicates an issuing security domain specified for the memory access transaction, where the issuing security domain is one of a plurality of security domains;

a target address; and a security check indication which indicates whether it is already known that the memory access transaction would pass a security checking procedure;

where said security checking procedure is for determining whether the memory access transaction indicating said issuing security domain is authorised to access the target address, based on control data indicative of which of the security domains are allowed to access the target address.

At least some examples provide a method comprising:

receiving memory access transactions, each memory access transaction specifying at least:

an issuing domain identifier which indicates an issuing security domain specified by an issuing master device for the memory access transaction, where the issuing security domain is one of a plurality of security domains;

a target address; and a security check indication which indicates whether it is already known that the memory access transaction would pass a security checking procedure;

where said security checking procedure is for determining whether the memory access transaction indicating said issuing security domain is authorised to access the target address, based on control data indicative of which of the security domains are allowed to access the target address; and the method comprises determining, on the basis of the security check indication, whether the security checking procedure still needs to be performed.

Further aspects, features and advantages of the present technique will be apparent from the following description of examples, which is to be read in conjunction with the accompanying drawings.

BRIEF DESCRIPTION OF THE DRAWINGS

FIG. 12B shows possible outcomes for each combination of security check indications of the transaction and cache entry of FIG. 12A.

DESCRIPTION OF EXAMPLES

Figure 1:
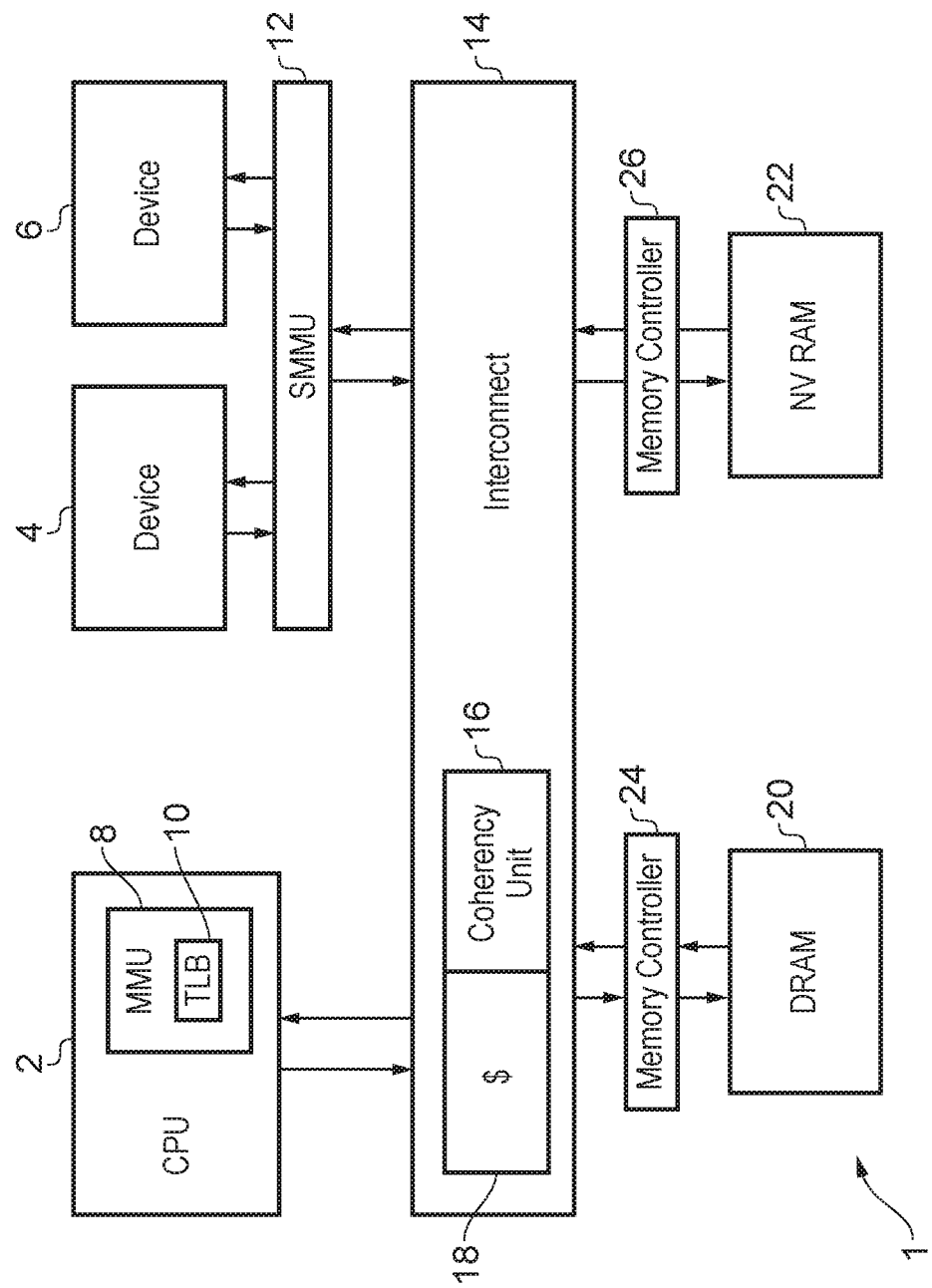
FIG. 1 schematically illustrates an example of a data processing apparatus.

Some specific examples are shown below. It will be appreciated that the invention is not limited to these examples.

In some architectures, separate secure and non-secure memory spaces are provided, associated with the secure and non-secure domains respectively. The architecture may assume that the secure and non-secure memory spaces map to physically distinct hardware storage. However, in some implementations, it may be useful for the hardware storage regions (e.g. blocks of DRAM pages) to be dynamically assigned to the secure or non-secure domains.

For example, when operating in a non-secure domain, a device such as a CPU that issues memory access transactions can only access target addresses that are also associated with the non-secure domain. Transactions issued in a secure domain may only be able to access addresses associated with the secure domain, or alternatively in some examples, the secure domain may be allowed to access memory associated with both secure and non-secure domains. It will be appreciated that in this example, only two domains are described (secure and non-secure) but the number of domains provided is a design choice and will be dependent on the implementation, so more than two domains could be provided.

In some architectures, the mapping of domains to regions of memory is fixed. However, in a situation where the mapping is not fixed, more detailed control data may be used to define the mapping of secure and non-secure memory spaces. This means that in order to security check a transaction (to check if the domain it was issued in is able to access the memory address it is targeting) a lookup may be performed in the control data, which may include access to tables in memory. This can be an energy hungry and time consuming process, and as such it is advantageous that this be done as infrequently as possible.

In some systems, the master device that issues the memory access request has the ability to perform the security check before the transaction gets propagated downstream to the memory system. Other devices using the same interconnect and or memory unit may not have this ability and so transactions may also be security checked at one of these downstream stages.

In some systems, the downstream stages such as an interconnect or memory controller, have no ability to know whether a transaction has already been security checked. This means that all transactions have to be checked, and some may be checked twice or three times at different stages in the system.

The present technique provides a solution by including in the encoding of a transaction an indicator showing whether a transaction has been security checked. This means system designers have flexibility to vary, on a master by master basis, whether checks are done at either the master device itself or downstream in the memory system, without incurring the latency twice. Without such a security check indicator, one or other of the approaches must be chosen, which either limits the kind of master devices that can be provided (for some masters it may not be practical to provide control data checking logic), or all accesses have to be security checked in the downstream memory system (potentially requiring multiple checks performed redundantly if the master has already done it). As described above, this has an adverse effect on performance when some of the master devices in the system perform the security check and it is repeated at a downstream component.

In at least one example of the present technology, a memory system component is provided comprising transaction handling circuitry to receive memory access transactions. Memory access transactions each specify at least an issuing domain identifier, a target address and a security check indication. The encoding of the transaction may include other information such as the type of access (read or write) or other transaction identifiers, but it will be appreciated that this is not essential to carry out the present technique.

The issuing domain identifier indicates an issuing security domain specified by an issuing master device for the memory access transaction, where the issuing security domain is one of a plurality of security domains. The issuing security domain might be the domain in which the master device was operating when it issued the request. During a domain switch there may be other rules which dictate which domain the master device specifies. The issuing domain identifier may be a simple secure or non-secure flag. It may also be a more complex indication, particularly if the system supports more than two possible domains.

The master device may be a relatively complex CPU which is able to operate in any of the possible domains (worlds). It may however, be another device with access to the same areas of memory, which may not be able to operate in one of the domains (e.g. some master devices may be considered to permanently operate in the less secure domain). The issuing domain identifier may not indicate to the memory system component which master device issued the transaction, but may simply indicate which domain the access is associated with.

The target address included in the memory access transaction defines where in memory the data should be accessed in response to the transaction. This address has one or more domains which are allowed to access the data held there, depending on the control data.

The security check indication indicates whether it is already known that the memory access transaction would pass a security checking procedure. This is not necessarily an indication that the transaction has undergone the security checking procedure, but provides an indication of whether it is known that the transaction would pass (e.g. as described below, there may be ways of inferring that the transaction would pass without actually performing the security check, e.g. based on information stored in a cache). In the following description, a "positive" security check indication signifies that the transaction would pass the security checking procedure. An "unknown" indication signifies that the security checking procedure still needs to be performed. The security check indication is not an indication that the procedure has passed or failed—a transaction marked with an "unknown" security check indication could either pass or fail the security checking procedure once performed later.

The security check indication may be an explicit indicator in the encoding of the transaction. For at least one of the domains the security check indication is explicit and dependent on whether it is known that the security checking procedure would pass. In some examples, the security check indication might otherwise be implicit from the other details of the transaction. For example, if transactions issued in the secure domain have access to both secure and non-secure memory, a secure issuing domain identifier may be enough to signify that the transaction would pass the security checking procedure. However, a transaction issued in the non-secure domain may need a separate, explicit indication to indicate that the security checking procedure would pass or that alternatively the security checking procedure still needs to be performed.

The security checking procedure is for determining whether the memory access transaction indicating said issuing security domain is authorised to access the target address, based on control data indicative of which of the security domains are allowed to access the target address. The areas of memory which can be accessed by each of the domains are defined by the control data, which as above may change. The security checking procedure therefore checks that the target address specified by the transaction is an address within an area of memory associated with the issuing domain. If the target address is accessible by the issuing domain, then the transaction passes the security checking procedure. If the target address is in an area not allowed to be accessed from the issuing domain, the security checking procedure fails.

The memory system component also comprises control circuitry to determine, on the basis of the security check indication, whether the security checking procedure still needs to be performed. If the security check indication indicates that the transaction would pass the security checking procedure, the control circuitry determines that the security checking procedure does not still need to be performed.

In at least one example of the present technique, when the control circuitry determines that the security checking procedure still needs to be performed, the control circuitry is configured to control security checking circuitry to perform the security checking procedure. This may involve sending a control signal to another component of the system (e.g. in a downstream memory system component in the memory system, to which the memory system component routes an issued transaction), or another element of the same memory system component.

The memory system component may comprise the security checking circuitry. The memory system component can therefore perform the security checking procedure if it is determined that it still needs to be carried out. The security check indication for the transaction can then be changed, and the transaction propagated downstream in the system. Thus, a memory system component can mark transactions as checked before they reach the memory itself.

When a given memory access transaction fails the security checking procedure, the security checking circuitry may be configured to signal an error and to prevent the given memory access transaction from propagating downstream of the memory system component. That is, if the issuing domain for a given transaction is not an allowed domain for the given target memory address, an error is signalled. By preventing the transaction from propagating downstream, it does not reach the memory access stage, and there is less delay. As such, the security check indication may not have an encoding that signifies a transaction has failed the security checking procedure, only that the security checking procedure has not yet been completed, or the transaction would pass the security checking procedure.

In some examples, when the control circuitry determines that the security checking procedure still needs to be performed, the control circuitry is configured to control downstream security checking circuitry to perform the security checking procedure. The control circuitry ensures that the security checking procedure is performed, but the procedure may be performed by another component further downstream of the memory system component. In some cases, the presence of an unknown security check indication itself may trigger the downstream security checking circuitry to perform the security checking procedure. Alternatively, the transaction may be propagated downstream without a security check indication, but with a separate control signal to cause the security checking circuitry to perform the security checking procedure.

The target address may be a physical address. The areas for which the control data defines which domain has access may be areas of physical address space. These could be regions of physical memory which are on or off chip. The memory storage, for which the control data identifies which domains can access a given address, may include dynamic random access memory (DRAM) for example.

The control data may comprise a number of entries, each associating at least one region of address space with at least one of the plurality of security domains. There may be a table for example, holding the mapping between addresses and their allowed domains. It may be possible to perform a lookup this table to determine whether a transaction has the correct combination of address and issuing domain. The table may be stored in main memory, or a copy may be cached locally to the memory system component. An address may be associated with more than one allowed domain.

The security checking procedure may include comparing the issuing domain identifier with the at least one of the plurality of security domains associated with a region of address space including the target address. That is, the security checking procedure may involve directly checking if the issuing domain and the allowed domain for the target address are the same. This may include performing the lookup described above and comparing the result with the issuing domain identifier. Similarly, if the system uses a hierarchy of security domains, it may be enough to check that the issuing security domain has a security level equal to or higher than the domain associated with the target address. Thus, the allowed domain for the target address is not necessarily required to be an exact match to the issuing domain.

In some examples, the plurality of domains includes at least a secure domain and a less secure domain. These could otherwise be labelled as a secure world and a non-secure world or similar. For example, a master device operating in the secure domain may have access to areas of memory associated with the secure domain, while a master device operating in the less secure domain may not be allowed to access areas of memory associated with the secure domain. In some implementations, master devices operating in the secure domain have access to regions of memory associated with both the secure and non-secure domains; whilst the devices operating in the non-secure can only access regions of memory associated with the non-secure domain. In this case, the control data would not necessarily need to be referenced for a security checking procedure performed on a transaction issued in the secure domain. Hence, in some examples the checking of the security check indication may only be performed for transactions associated with the less secure domain, but not for secure transactions.

In at least one example of the present technique, the memory access transaction supports an encoding which indicates that the issuing security domain is the less secure domain and the transaction is known to pass the security checking procedure. That is, there is an explicit encoding for a transaction issued in a less secure domain which would pass the security checking procedure. As above, it may be implicit (in some examples) from the secure issuing domain that the transaction would pass the security checking procedure. Otherwise, there may also be an explicit encoding for each of the issuing domain and the security check indication.

The memory system component may comprise a cache comprising cache entries to cache data obtained in response to previously received memory access transactions. Each cache entry is indexed by a combination of the target address and issuing security domain. By indexing using a combination of target address and issuing domain, the cache can store secure and non-secure entries for the same target address in separate cache lines. This is useful for security, performance and flexibility because it enables cache entries to be allocated before the security checking procedure has been performed, but with reduced risk of a security breach occurring, because non-secure accesses cannot hit on secure cached data as the secure/non-secure domain identifiers will index into different entries of the cache.

The control circuitry may be configured to determine whether the security checking procedure still needs to be performed for a given memory access transaction, on the basis of the security check indication specified by the given memory access transaction and a cache entry check indicator of a cache entry corresponding to the combination of the target address and the issuing security domain for the given memory access transaction. The cache entry check indicator stored in the cache entry indicates whether the security checking procedure would be passed for a transaction with the same combination of issuing domain and target address.

Hence, information stored in the cache for the same combination of target address and issuing domain can be used to infer whether the transaction would pass the security checking procedure. For example, if a transaction indicates that the security checking procedure does need to be performed, but there is an entry in the cache with the same combination of target address and issuing security domain that indicates that the security checking procedure would pass, then the transaction can be assumed to also pass the security checking procedure. Therefore if the cache holds a positive indication, the transaction can also be updated to have a positive indication, even if the security checking procedure is not explicitly performed. This means that transactions issued from a master device which does not have the functionality to perform the security checking procedure can avoid the need for the full security checking procedure to be carried out by the memory system component. If a similar transaction has already been shown to pass the security checking procedure with the same combination of issuing domain and target address, it can be inferred that the current transaction would pass.

When the cache entry check indicator indicates that the security checking procedure would be passed for a given combination of the target address and the issuing security domain specified by the given memory access transaction, the control circuitry determines that the security checking procedure does not need to be performed for the given memory transaction, even if the security check indication specified by the given memory access transaction indicates that it is unknown whether the security checking procedure would be passed for the given memory access transaction.

Similarly, when the security check indication for the given memory access transaction indicates that the given memory access transaction would pass the security checking procedure, and the cache entry check indicator does not indicate that the security checking procedure would be passed for the given combination of target address and issuing security domain, the cache is configured to update the cache entry check indicator to indicate that the security checking procedure would be passed for the given combination of target address and issuing security domain. That is, the cache entry can be updated when a transaction with a positive security check indication hits against that cache entry.

If the security checking procedure is performed at the memory system component, or another downstream component, the cache entry check indicator might also be updated to indicate that the combination of target address and issuing domain would pass the security checking procedure. If the memory system component receives a valid response to a memory access transaction (issued downstream), then it can be inferred that the security checking procedure passed in a downstream component (if the security checking procedure had not passed, then an error would be signalled and a response to the transaction not issued), so receipt of a valid response to a memory access transaction could also trigger update of the cache entry check indicator to indicate that a corresponding combination of domain/address passed the security checking procedure.

In this way, when at least one of the transaction, and corresponding cache entry suggest that the transaction would pass the security checking procedure, it is determined that the transaction would pass, and so it is not necessary to perform the security checking procedure again.

In some embodiments of the present technology, a master device is provided comprising transaction issuing circuitry to issue memory access transactions; and encoding circuitry to encode each memory access transaction. The encoding specifies at least an issuing domain identifier, a target address; and a security check indication. As above, if a transaction is encoded with a security check indication, this can be referenced at downstream components in the memory access system. This enables master devices in the same system to optionally include security checking circuitry to carry out the security checking procedure, without the latency associated with checking some transactions repeatedly.

The master device may also comprise security checking circuitry to perform the security checking procedure; and determination circuitry to determine whether or not the security checking procedure should be performed. The security checking circuitry in the master device may reference a cache of the control data used for the security checking procedure. The cached control data could be stored in a dedicated cache for control data, or a general cache also shared with other types of data. The master device may therefore issue, encode and security check the transaction before it is propagated downstream towards main memory.

The encoding circuitry may be configured to set the security check indication based on the determination made by the determination circuitry. For example, the determination circuitry may determine that the security checking procedure should be performed, security checking circuitry may then perform the security checking procedure (and pass) and the encoding circuitry may then encode a positive security check indication indicating that it is known that the security checking procedure would pass. Alternatively, the determination circuitry may determine for a secure domain, that all transaction would pass the security checking procedure and as such no security checking procedure is performed, but the transaction is encoded with a positive security check indication as it is known that the security checking procedure would pass. Further, it may be determined that the security checking procedure should not (or cannot) be performed, but needs to be performed at a component downstream of the master device, so the transaction is encoded with an unknown security check indication, indicating that the security checking procedure is not known to pass and needs to be performed downstream.

In some examples, the determination circuitry is configured to make the determination as to whether or to perform the security checking procedure, on the basis of at least one of:

the issuing security domain, and
whether the memory access transaction encountered a miss in a given level of cache, where said cache is one of:
a data cache; and
a control data cache to cache said control data indicative of which of the security domains are allowed to access the target address.

As the security checking procedure involves checking the control data, if the relevant control data is not available to the master device, it may be more efficient to issue the transaction without performing the security checking procedure, to allow the transaction to make progress and perform the security checking procedure closer to the point at which the control data is stored in memory. This can reduce the delay in servicing the transaction compared to if the master device waited for the control data to become available before checking and issuing the transaction. As the control data could be stored in either a dedicated control data cache, or a general data cache which may store some or all of the control data, but may not be a dedicated control data cache, a miss in a given level of data cache or control data cache may cause the determination circuitry to determine to issue the transaction without performing the security checking procedure. In other words, if there is a cache miss, the control data may need to be gathered from memory, so it does not eliminate any latency to perform the security checking procedure at the master device. The transaction can be propagated downstream to a system component closer to the point at which the control data is stored.

Also, in some examples, if the issuing domain is a secure domain, the determination circuitry may determine that the transaction would always pass the security checking procedure, so whether or not the security checking procedure is performed could be dependent on the issuing domain.

Some embodiments provide a system comprising the master device and a memory system component. There may be a plurality of memory master devices and a plurality of memory system components in the same system.

FIG. 1 shows an example of a data processing apparatus 1 to which the present technology could be applied. Memory access transactions (or requests) are issued by a master device, and propagate downstream towards the memory. The results (e.g. return of read data for a read transaction, or return of a write acknowledgement for a write transaction) are then transferred back to the master device. A CPU 2 and devices 4 & 6 are examples of master devices which could issue transactions. The CPU 2 may include a memory management unit (MMU) 8 for controlling address translations and access permissions to memory based on page table structures defined in the memory system. The MMU may also include a cache for address translation data, called a translation lookaside buffer (TLB) 10. The memory system component according to the present technology may be included in the CPU 2. The CPU 2 may act as the master device according to the present technology.

A system memory management unit (SMMU) 12 may be included to control address translations and access permissions to memory for devices 4 & 6 which do not include an MMU. The memory system component described earlier may be located in the SMMU 12. The devices 4 & 6 may act as master devices according to the present technology. In some examples, the SMMU 12 could also be seen as a "master device" as discussed below, in the sense that it encodes the transaction comprising the physical address.

The interconnect 14 may manage transactions for a plurality of master devices. It may be a coherent interconnect and include a coherency unit 16 to carry out coherency protocols. The interconnect 14 may also include a system cache 18 to cache data accessible to any of the masters 2, 4, 6. The memory system component may be included in the interconnect 14 and may make use of the cache 18.

The system 1 may also include physical memory such as DRAM 20 or non-volatile random access memory (NVRAM) 22, connected to the interconnect 14 via memory controllers 24 & 26. The DRAM or NVRAM can be examples of on-chip memory, but memory could also include off-chip memory accessed via an input/output unit. Memory controllers 24 & 26 control read and write access to the memory 20 & 22. The memory controllers 24, 26 may include the memory system component according to the present technology. It will be appreciated that a system that employs the present technology may also include many more components not shown in this figure for the sake of conciseness.

Figure 2:
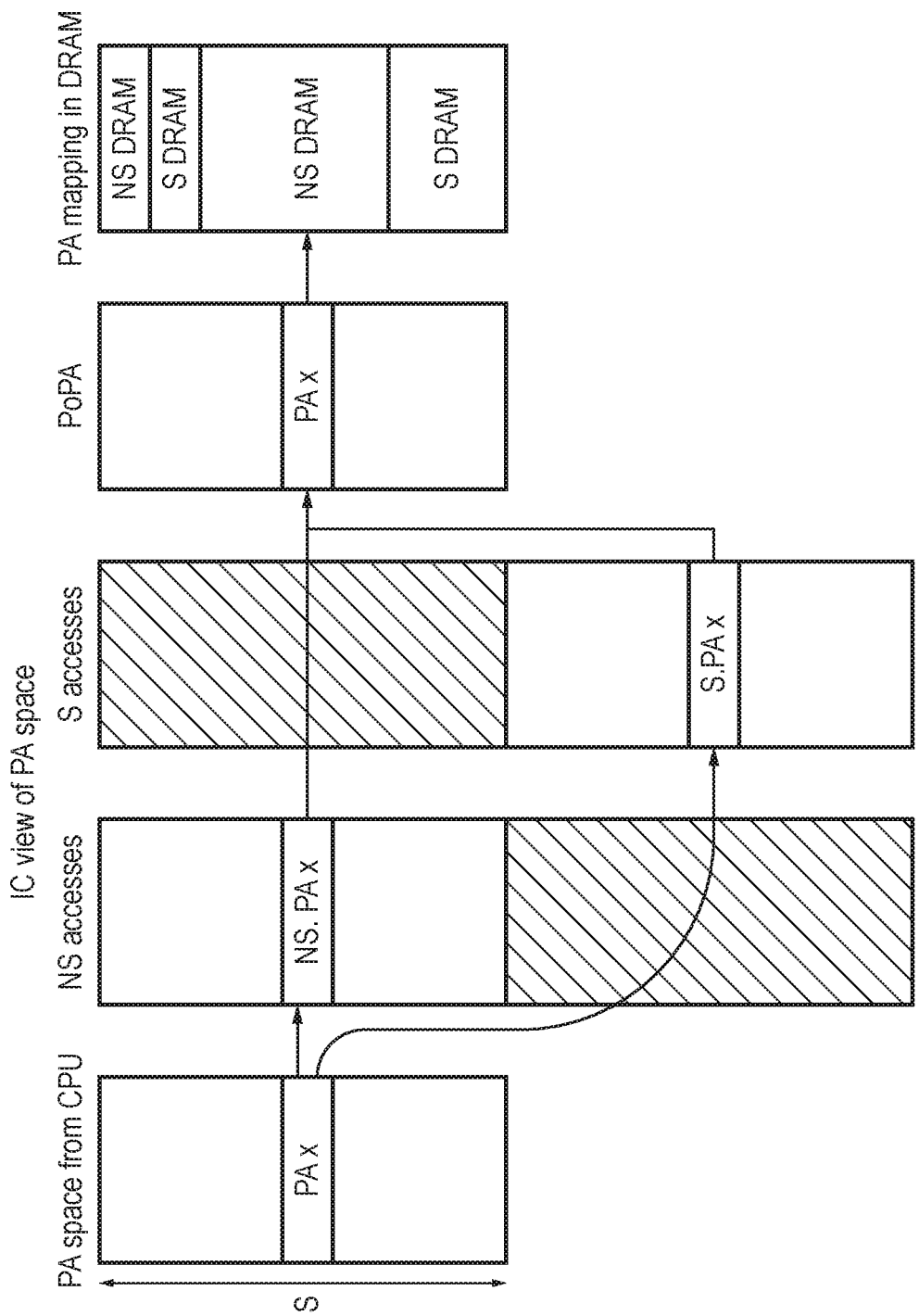
FIG. 2 schematically illustrates an example of physical address spaces as viewed by different points of a data processing apparatus.

FIG. 2 schematically illustrates an example of a physical address space as seen at different stages in a data processing apparatus. The physical address space as seen by the CPU 2 (or another master device) is shown on the left of FIG. 2 and is of size s. In this example, the CPU 2 has no information about which areas of memory are accessible by each of the secure and non-secure domains. When issuing a memory access transaction then from a non-secure issuing domain, and having a target address $PA_x$ for example, there is no indication as to whether this address is in the non-secure address space.

From the point of view of the interconnect 14, the address space is of size 2s as the issuing domain and target address are combined. However, transactions issued in the non-secure domain only have access to half of the possible address space, while transactions in the secure domain have access to the other half. That is, each combination of issuing domain and target address has a unique address in the mapping as seen by the interconnect 14. If the transaction accessing $PA_x$ is issued in the non-secure domain, the interconnect 14 sees it accessing the address $NS \cdot PA_x$, whereas if issued in the secure domain it sees $S \cdot PA_x$. As such, the issuing security domain is treated as an extra address bit as seen by the interconnect 14. The cache 18 as shown in FIG. 1 may be indexed by the combination of NS/S bit and address, so the addresses $NS \cdot PA_x$ and $S \cdot PA_x$ map to different cache entries.

While FIG. 2 shows an example where the issuing domain bit is appended at the most significant end of the address, the issuing domain bit could also be inserted into the address at a different position, so that the secure and non-secure portions of the physical address space seen by the interconnect 14 are not necessarily contiguous, but could be a number of interleaved regions separated by regions from the other domain.

At the point of physical alias (PoPA) the address space once again returns to size s. The PoPA is the boundary between a component (e.g. the interconnect 14) which treats transactions from different issuing domains for the same target address as if they actually reference separate addresses (by considering the domain identifier as additional address information), and a component (e.g. the memory controller 26) which specifies a physical address without including an issuing domain identifier. Beyond the PoPA the secure and non-secure domains would access the same region of memory if they specify the same address.

Beyond the PoPA, the address space of size s can be compared with the physical address mapping as seen by the DRAM. That is, control data may be defined which indicates regions of the DRAM's storage which are associated with the secure and non-secure domains respectively (see right hand side of FIG. 2). The control data may be stored in a data structure stored in the memory system, which can be cached within caches of the CPU or interconnect or other memory system components, to allow a comparison between the issuing domain of a transaction and the domains allowed to access the region corresponding to the specified PA. The data structure may be defined as secure memory, so that accesses and modifications to the control data itself can be controlled.

It will be appreciated that the example of FIG. 2 is simplified for ease of explanation. In some systems, DRAM regions associated with the secure domain may correspond to a relatively small fraction of the address space compared to those DRAM regions associated with the non-secure domain. Also, it is not essential for the full physical address space to be partitioned between the secure and non-secure DRAM regions—in practice the physical address space may be sparsely populated with secure/non-secure DRAM regions, and those secure/non-secure DRAM regions may be fragmented across the DRAM address space, as pages of the address space may be dynamically reassigned between secure and non-secure.

Figure 3:
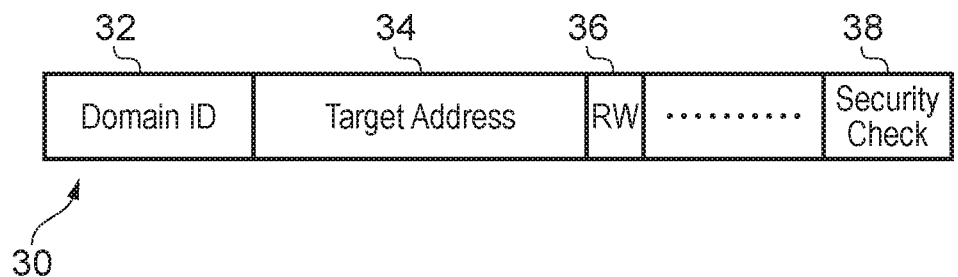
FIG. 3 schematically illustrates an example memory access transaction.

FIG. 3 schematically illustrates an example memory access transaction 30. The domain ID 32 indicates the issuing domain (or domain). This could be a simple 1/0 indication for secure/non-secure domains, or could be a more complex identifier. The target address 34 is the physical address which is to be read from/written to in response to the transaction. The R/W indicator 36 indicates whether the transaction is a read or a write transaction. The security check indicator 38 indicates if it is known that the transaction would pass the security checking procedure. It will be appreciated that in this example, a separate encoding for domain id 32 and security check indication 38 is provided, although in other examples a combined indicator may be provided. There may be other information included in the transaction encoding, but this is not shown here for the sake of brevity.

Figure 4:
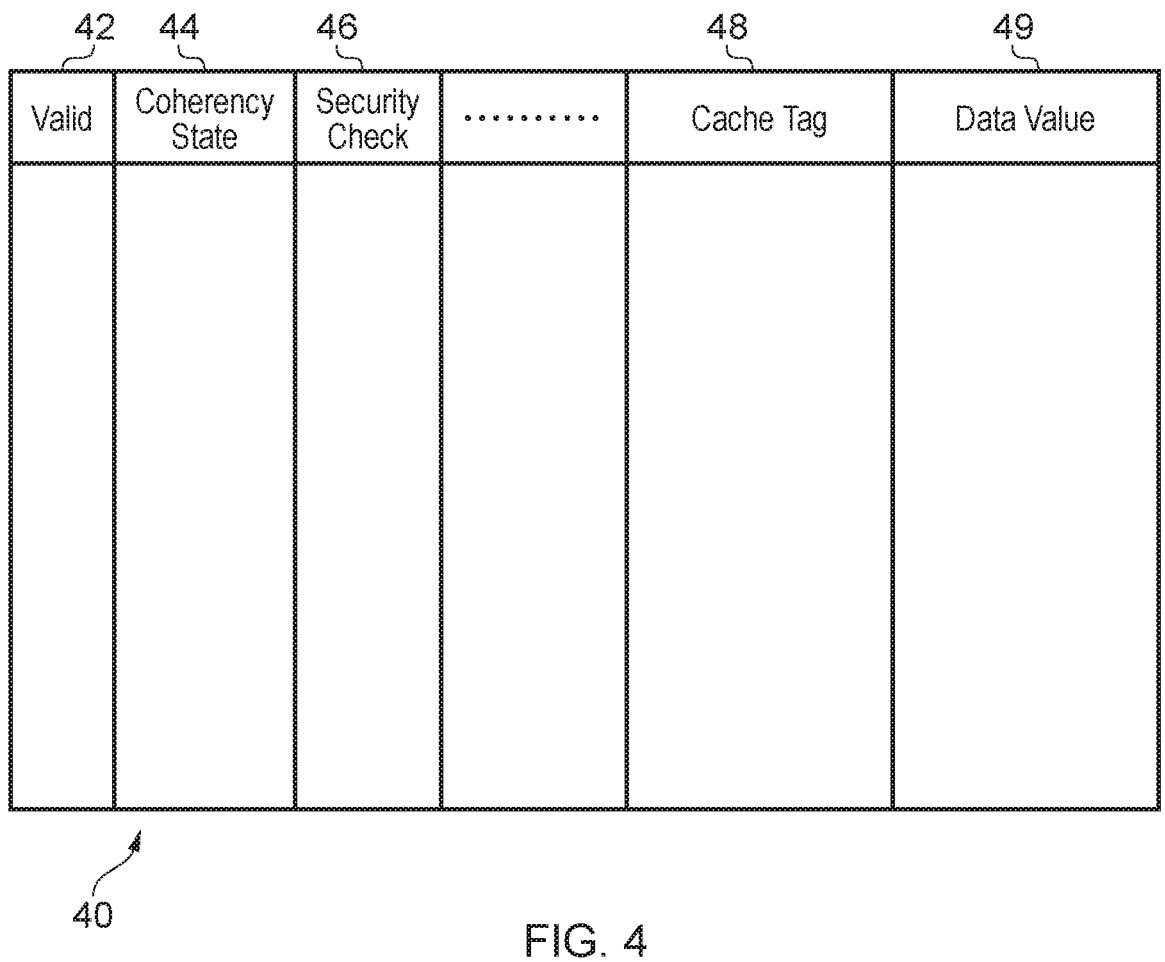
FIG. 4 schematically illustrates a cache holding data entries.

FIG. 4 schematically illustrates a cache 40 holding cache entries. Each entry comprises a validity indicator 42 to indicate whether the entry is valid. The coherency state 44 indicates the coherency status of the entry (e.g. clean/dirty, or unique/shared, or other states depending on the coherency protocol used). The security check indicator 46 indicates whether it is known that a transaction with the same combination of issuing domain and target address would pass the security checking procedure. The cache is indexed using the issuing domain and a portion of the target address, and the cache tag 48 is the remaining portion of the target address, which can distinguish different addresses which index into the same cache entry (or set of cache entries). This approach means that the indexing is such that there are separate cache entries associated with non-secure and secure accesses to the same target address. The data value 49 is the data value associated with the target address (which could be clean or dirty). It will be appreciated that again, more information may be held in each cache entry, but it has been omitted here for conciseness.

Figure 5:
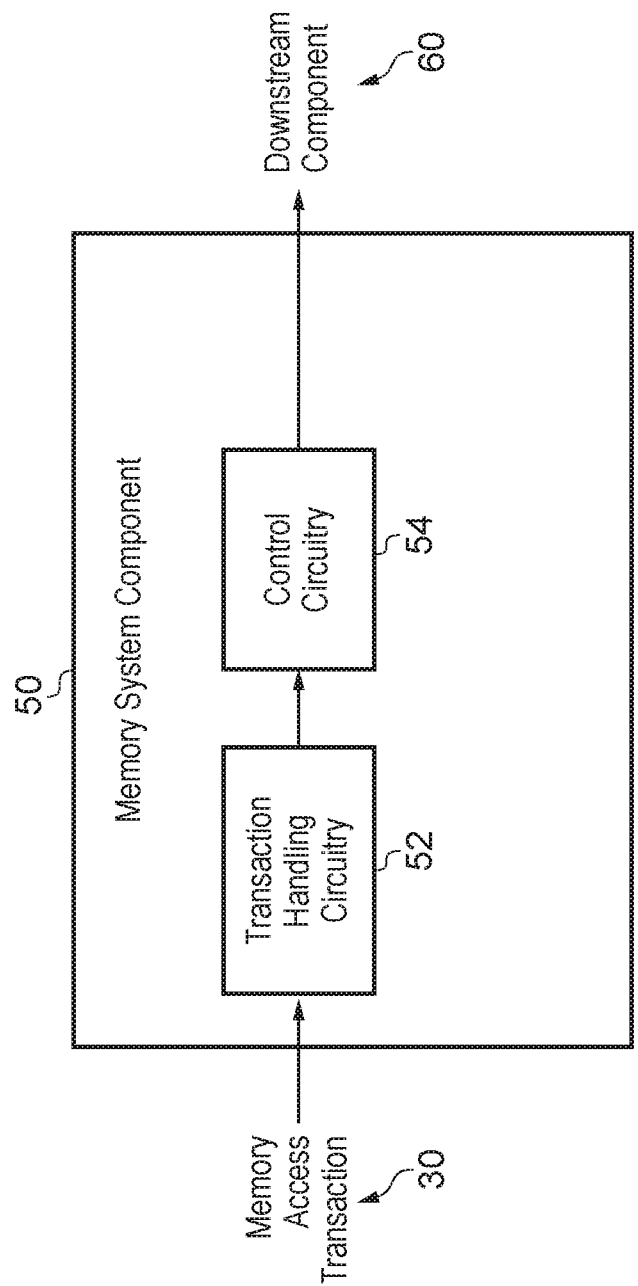
FIG. 5 schematically illustrates an example of a Memory System Component.

FIG. 5 schematically illustrates an example of a Memory System Component 50 which could be located in the interconnect 14 or memory controllers 24, 26 of FIG. 1 for example. A memory access transaction 30 is received by the transaction handling circuitry 52. The memory access transaction includes at least an issuing domain identifier, a target address and a security check indication. The issuing domain identifier indicates an issuing security domain designated by the issuing master device. The security check indication indicates whether it is already known that the memory access transaction 50 would pass a security checking procedure. The security checking procedure includes checking, based on control data, whether the issuing security domain is authorised to access the target address.

The control circuitry 54 checks the security check indication to determine whether the security checking procedure still needs to be performed. The memory access transaction is then passed to a downstream component 60. The control circuitry might therefore control a downstream component to perform the security checking procedure, the transaction including target address and issuing domain may be propagated downstream separately to a control signal indicating that the security checking procedure needs to be performed. The security checking circuitry may also be included in the Memory System Component 50. This is described with reference to FIG. 6 below. It will be appreciated that the memory system component may include other elements that are not shown here for simplicity.

Figure 6:
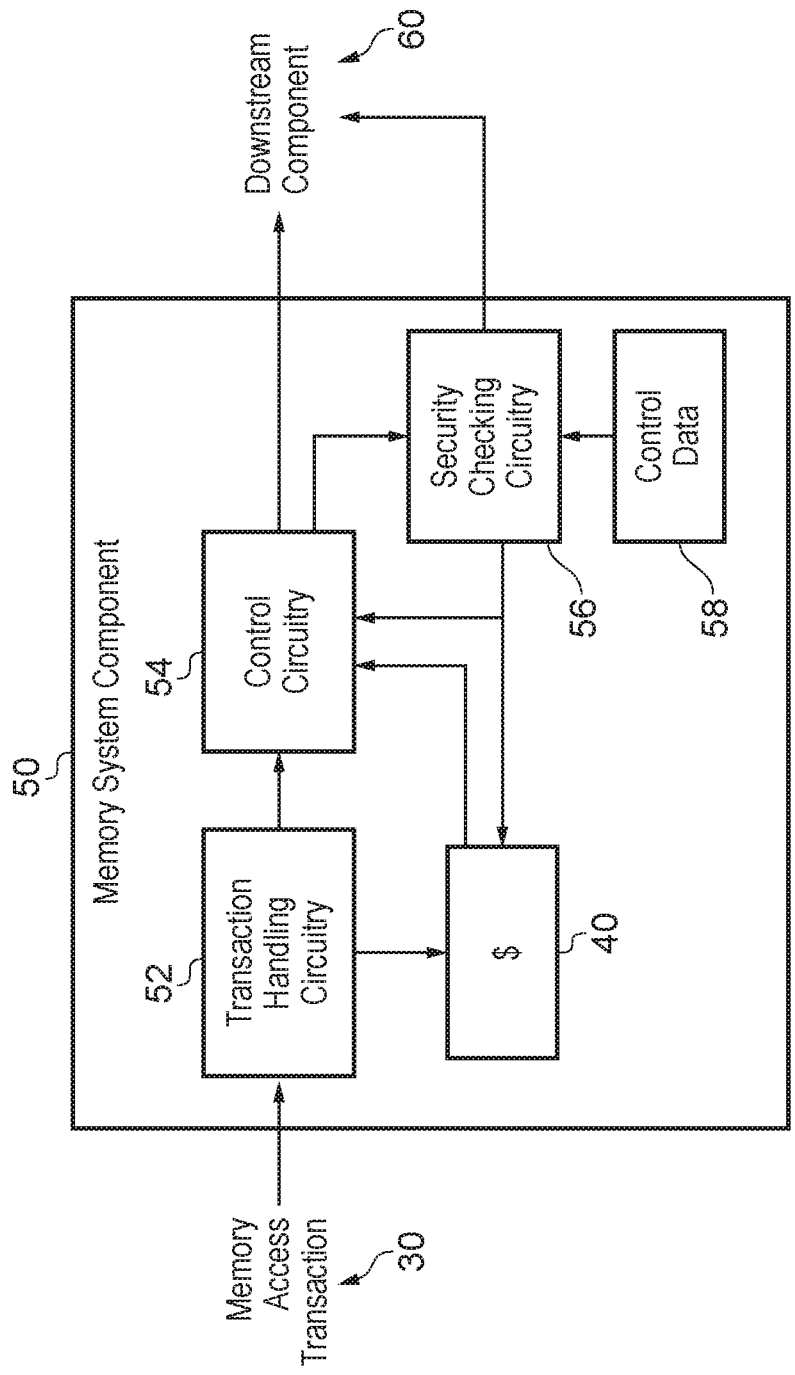
FIG. 6 schematically illustrates an example of a Memory System Component including security checking circuitry.

FIG. 6 schematically illustrates an example of a Memory System Component 50 including security checking circuitry 56. The memory access transaction 30 as described above is received by the transaction handling circuitry 52. Information derived from the transaction may be stored in the cache 40, if an entry with the same combination of issuing domain and target address does not already exist. If an entry with the same combination does exist, it may be updated to have a positive security check indication if it does not already store this information.

The security check indication of the memory access transaction 30 is checked by the control circuitry 54. If the security check indication is positive (it indicates that the security checking procedure does not need to be performed), the memory access transaction is passed to the downstream component 60.

If the control circuitry 54 determines that the security checking procedure still needs to be performed (an unknown indication), this may be performed by the security checking circuitry 56 with reference to the control data 58. The control data could be looked up in downstream memory, or could be a local cache held in the memory system component. If the security checking procedure is passed the security checking circuitry 56 may then change the security check identifier to indicate a positive security check, and propagate the transaction to the downstream component 60. The security checking procedure may also update the cache 40 to indicate that an entry with the same combination of target address and issuing domain would pass the security checking procedure. If the security checking procedure fails, the security checking circuitry may signal an error and the transaction is prevented from propagating to the downstream component 60.

If the control circuitry 54 determines that the security checking procedure still needs to be performed (an unknown indication) but an entry in the cache 40 indicates that an entry with the same combination of issuing domain and target address would pass the security checking procedure, the control circuitry 54 can update the memory access transaction 30 with a positive security check indication and propagate the transaction to a downstream component 60. This means that the security checking circuitry 56 does not have to undertake a full security checking procedure including a lookup of the control data 58.

If the control circuitry 54 indicates that the security checking procedure still needs to be performed (an unknown indication), and the cache entry 40 indicates that it is not known whether the same combination of issuing domain and target address would pass the security checking procedure, the security checking circuitry 56 performs the security checking procedure with reference to the control data 58. If the security checking procedure passes, then the cache 40 may be updated to reflect this with a positive security check indication in the cache 40. If the security checking procedure fails, the memory system component 50 signals an error, ad the transaction is prevented from propagating to the downstream component 60.

Figure 7:
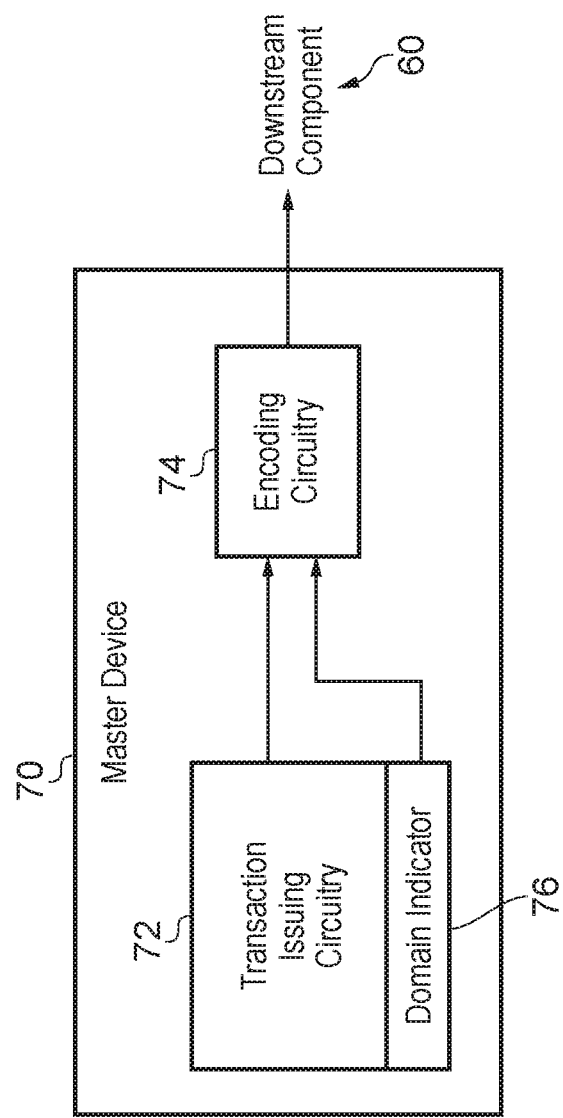
FIG. 7 schematically illustrates an example of a Master Device.

FIG. 7 schematically illustrates an example of a Master Device 70. The transaction issuing circuitry 72 issues a memory access transaction. The encoding circuitry 74 encodes the memory access transaction to include at least an issuing domain identifier, a target address and a security check indication. The issuing domain identifier may be derived from the domain identifier 76 included in the transaction issuing circuitry 72. In a master device that supports multiple domains, this could be a register which indicates the current domain and that is updated on a domain switch. In a master device that only supports non-secure transactions for example; the domain identifier 76 could be a hardwired circuit element which always holds the same value.

The encoding circuitry 74 encodes the target address directly received from the transaction issuing circuitry. The security check indication, as described above, indicates whether a security checking procedure still needs to be performed. This may be set to a default unknown indication (the checking procedure still needs to be performed as it is not known the security checking procedure would pass), or even if the checking procedure has not been performed, in some examples the security checking procedure may be set to be positive (the security checking procedure would pass) if the domain indicator indicates a secure domain and the secure domain is allowed to access all memory addresses. Once encoded, the memory access transaction is propagated to a downstream component 60.

Figure 8:
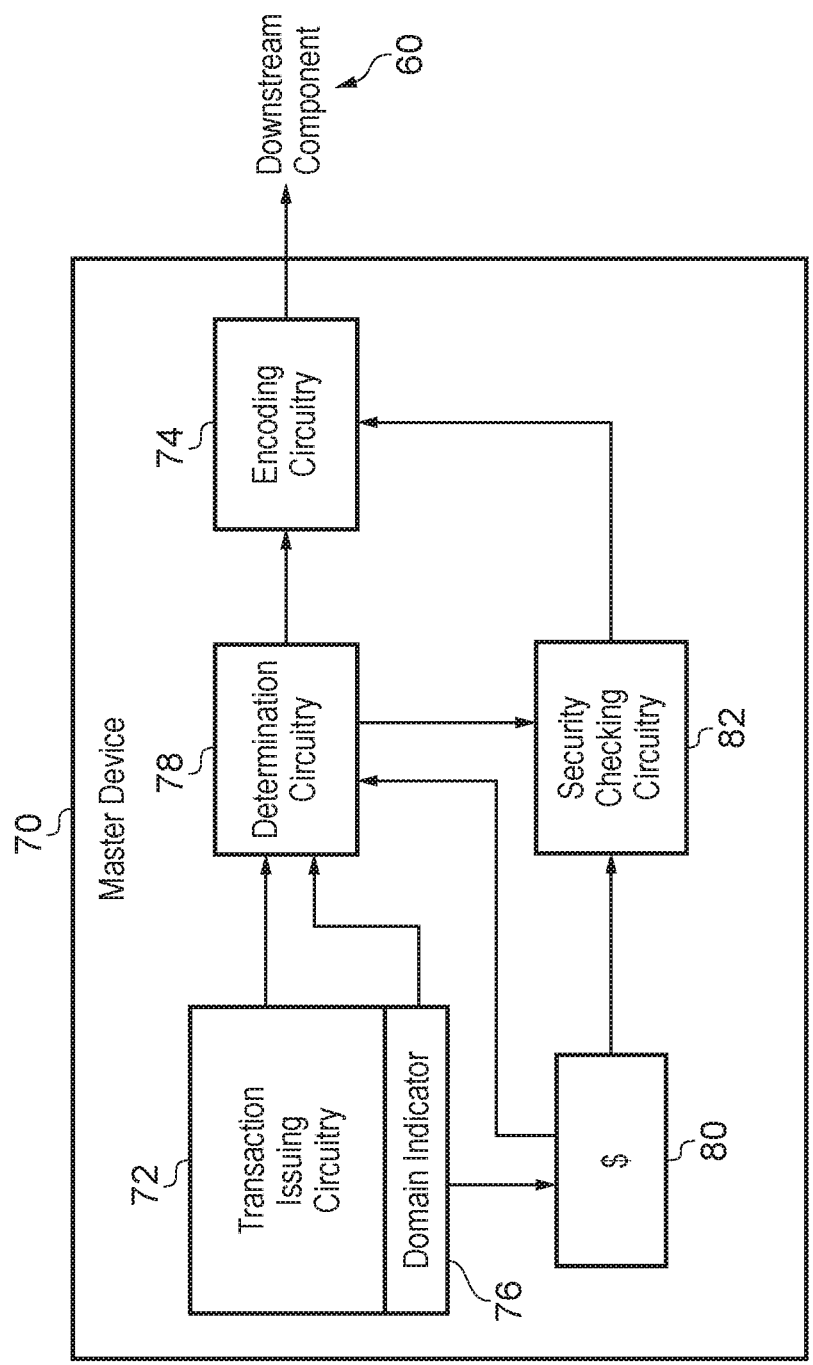
FIG. 8 schematically illustrates an example of a Master device including determination circuitry and security checking circuitry.

FIG. 8 schematically illustrates an example of a Master Device 70 including determination circuitry 78 and security checking circuitry 82. The transaction issuing circuitry 72 issues a transaction to the determination circuitry 78. The determination circuitry 78 then determines if a security checking procedure still needs to be performed. If for example the secure domain is allowed to access secure and non-secure memory, and the domain indicator 76 indicates that the transaction issuing circuitry 72 is operating in the secure domain, the determination circuitry 78 may determine that the security checking procedure does not need to be performed. In this case, the encoding circuitry 74 encodes a positive security check indication and propagates the memory access transaction to the downstream component 60. In some cases, the determination circuitry 78 may make its determination based on whether the transaction missed in a cache 80 (especially if the miss in the cache 80 is caused by a lookup of the control data needed for the security checking procedure—in this case it may be preferable to issue the transaction without performing the security checking procedure). If the security checking procedure is not performed, the encoding circuitry 74 encode the unknown indication of the security check indicator into the memory access transaction. Otherwise, the security checking circuitry 82 may perform the security checking procedure. The security checking procedure may utilise control data which may also be cached in the cache 80, or in a separate control data cache. If the security checking procedure is performed by the security checking circuitry 82 and the transaction passes, a positive security check indication may be encoded by the encoding circuitry 74. If the security checking procedure is performed and the transaction fails, an error may be signalled, and the transaction is prevented from propagating to the downstream component 60.

Figure 9:
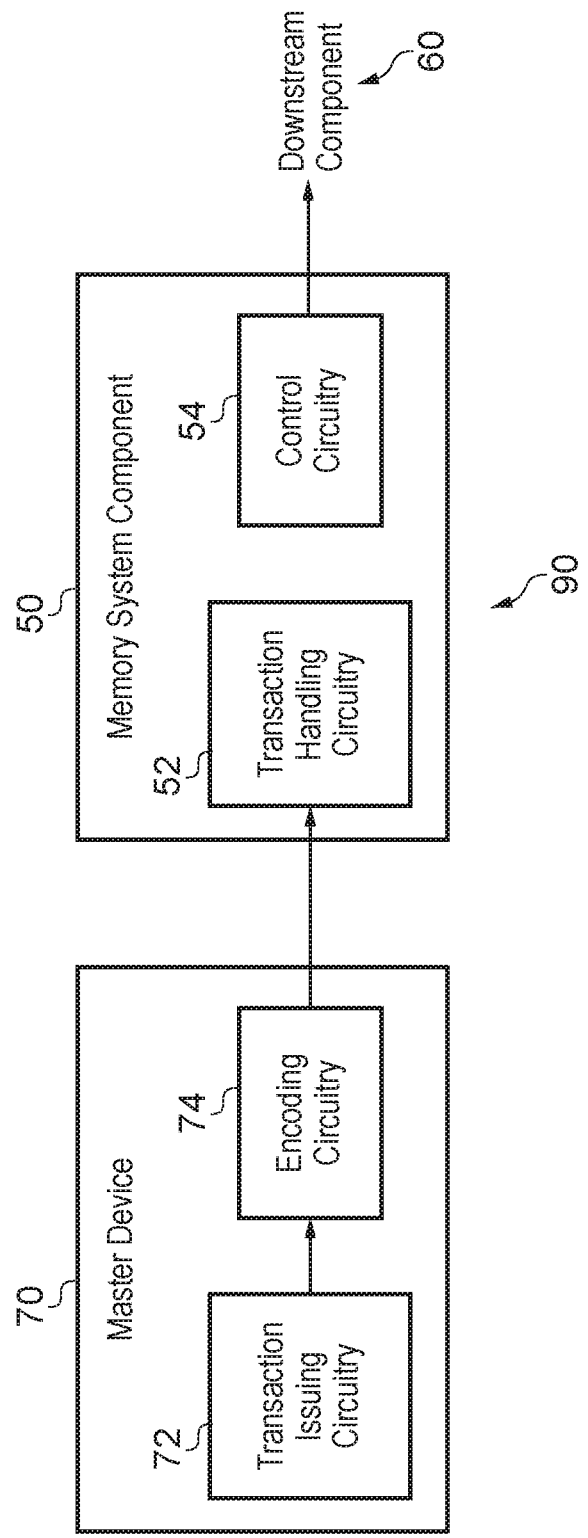
FIG. 9 schematically illustrates an example of a memory access system.

FIG. 9 schematically illustrates an example of a memory access system 90. The system includes a master device 70, in which the transaction issuing circuitry issues a memory access transaction. The transaction includes at least an issuing domain identifier, target address and security check indication. The encoding circuitry 74 encodes the transaction and it is then passed to the memory system component 50. The transaction handling circuitry 52 of the memory system component 50 receives the transaction. The control circuitry 54 checks whether the security checking procedure still needs to be performed for the transaction, with reference to the security check identifier. The transaction is propagated to a downstream component 60.

Figure 10:
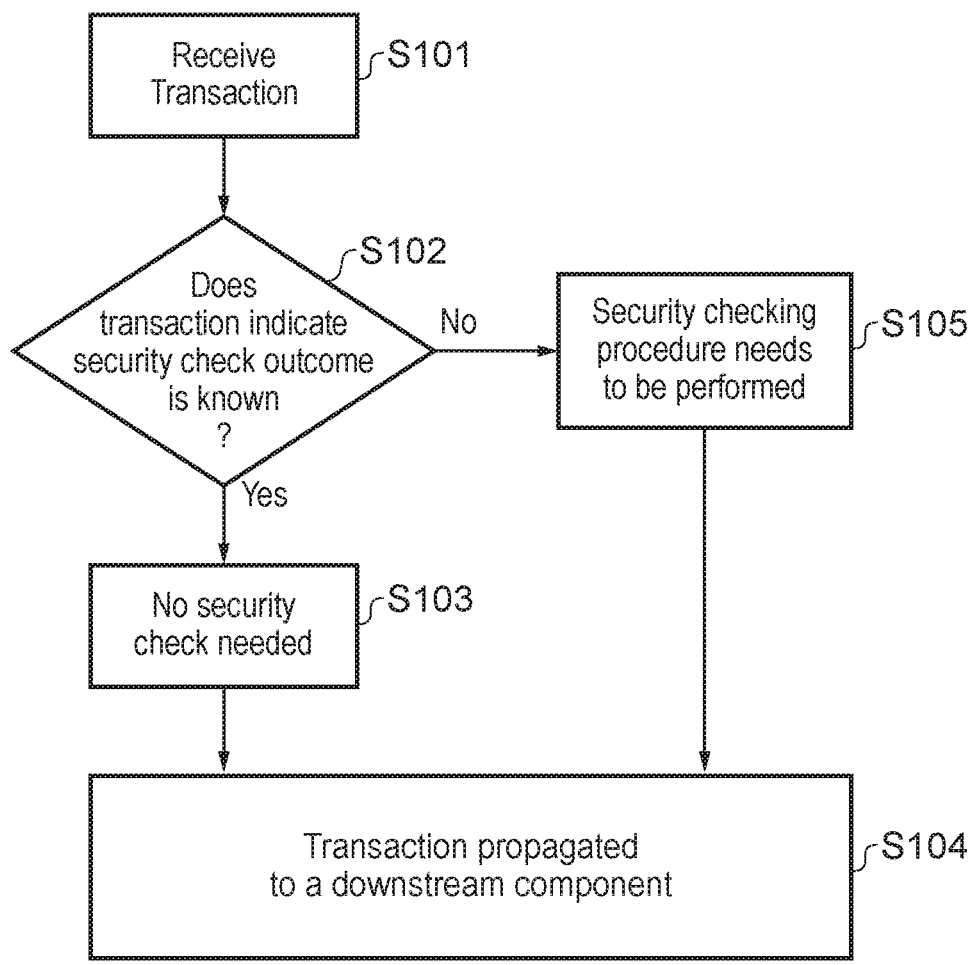
FIG. 10 shows a flow diagram illustrating steps in a method for handling memory access transactions.

FIG. 10 shows a flow diagram illustrating steps in a method for handling memory access transactions. At step S101 the transaction is received by a transaction handling circuitry. At step S102 a determination is made, based on the security check indication, as to whether it is already known that the security checking procedure would pass. If it would, then the process proceeds to step S103 and no security check is required and at step S104 the transaction is propagated to a downstream component. If the transaction does not indicate that it is known that the security checking procedure would pass, it follows that as shown at step S105 that the security checking procedure needs to be performed. A security checking procedure or a cache lookup may be performed at the memory system component, or the component may control another system element to perform the security checking procedure. It will be appreciated that these options are not shown as they are an implementation choice and many permutations would still fall within the scope of the present technology.

Figure 11:
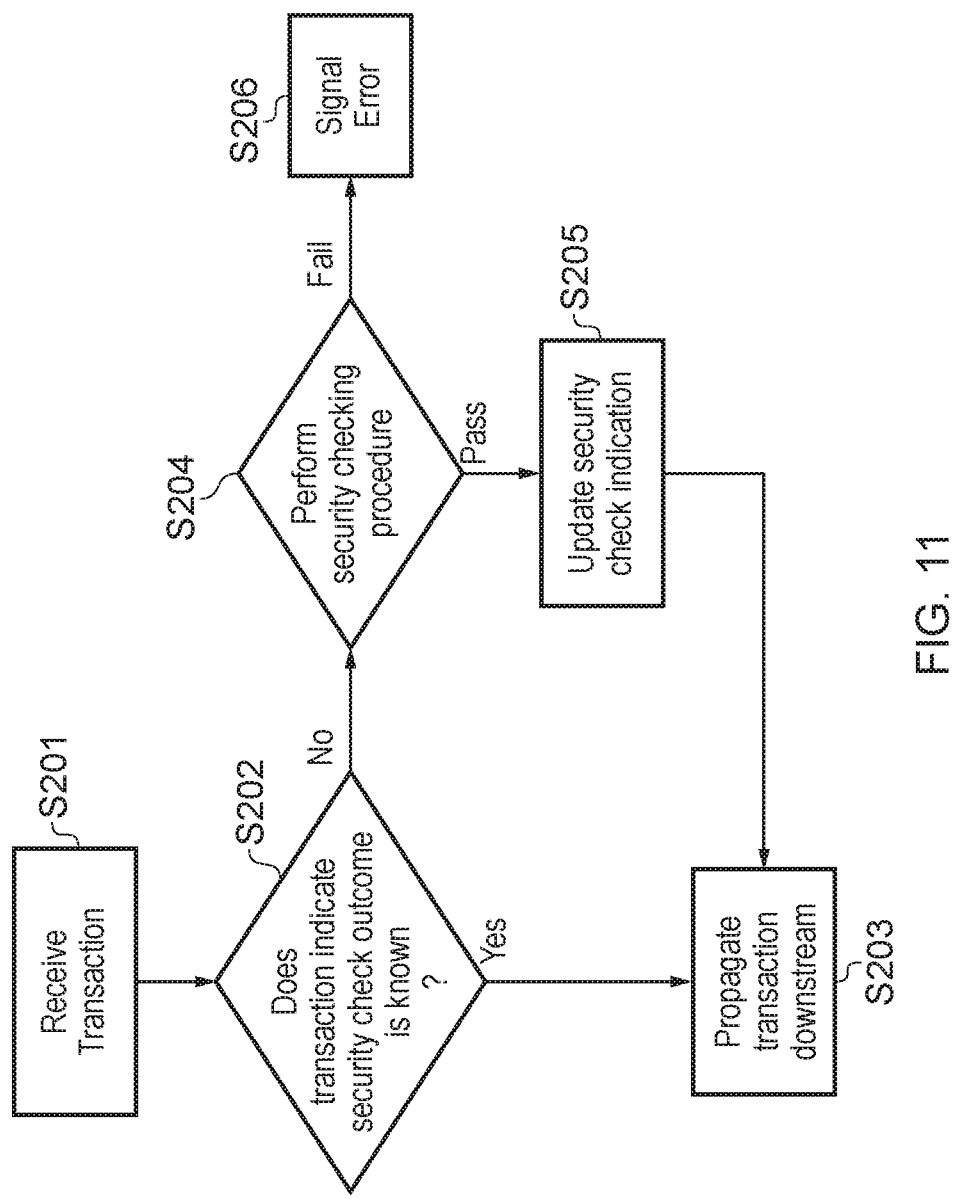
FIG. 11 shows a flow diagram illustrating steps in a method for handling memory access transactions including performing a security check.

FIG. 11 shows a flow diagram illustrating steps in a method for handling memory access transactions including performing a security check. At step S201 the transaction is received. At sept S202 a determination is made as to whether it is known that the security checking procedure would pass on the basis of the security check indication. If it would, the process proceeds to step S203 and the transaction is propagated downstream, without performing the security checking procedure. Otherwise, at step S204 the security checking procedure is performed. If the procedure passes, at step S205 the security check indication of the transaction is updated to indicate a positive security check indication, and the transaction is propagated downstream at step S203. If the security checking procedure fails at step S204, then at step S206 an error is signalled and the transaction is prevented from propagating to any downstream component.

Figure 12A:
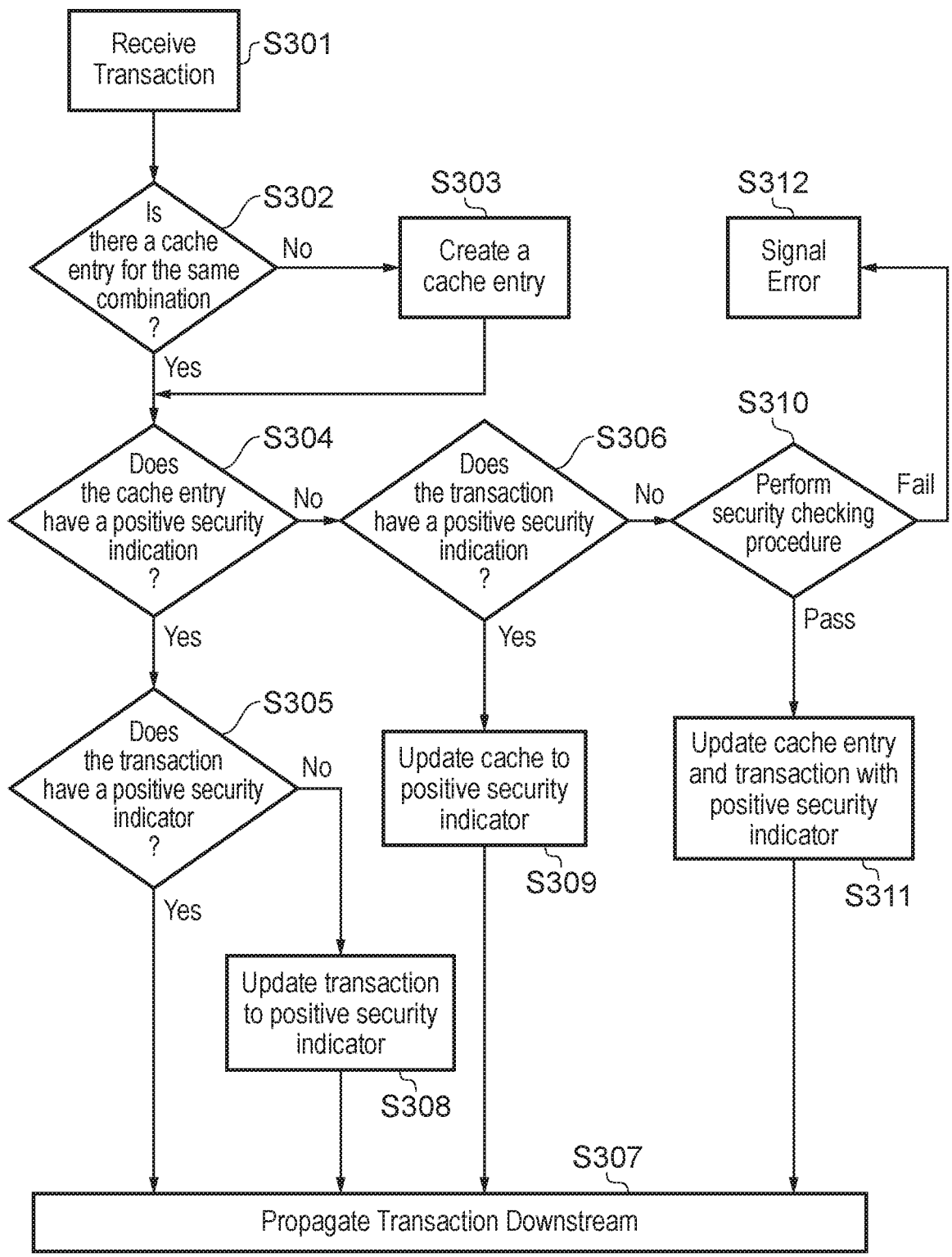
FIG. 12A shows a flow diagram illustrating steps in a method for a memory system component handling memory access transactions including comparing a transaction with a cache entry.

FIG. 12A shows a flow diagram illustrating steps in a method for handling memory access transactions including comparing a transaction with a cache entry. At step S301 a transaction is received. At step S302 a determination is made as to whether a cache entry with the same combination of issuing domain and target address can be found. If not, a cache entry is created (allocated) at step S303 for the issuing domain/target address of the transaction and the method continues as if a cache entry had been found at step S302.

At step S304 a determination is made as to whether the cache entry has a positive security check indication. That is, whether is it known that a transaction with the same combination of target address and issuing domain would pass the security checking procedure. Either way, another determination is made; either at step S305 or step S306 as to whether the transaction received has a positive security check indication (whether it is known that it would pass the security checking procedure). If the cache entry and the transaction both have positive indications, the transaction is propagated downstream at step S307. If the cache entry has a positive cache entry check indication at step S304 but does not have a positive transaction security check indication at step S305, then the method passes to step S308 and the transaction is updated to have a positive security check indication before it is propagated to a downstream component at step S307.

If the cache entry does not have a positive cache entry check indication at step S304, and the transaction does have a positive security check indication at step S306, then at step S309 the cache entry is updated to have a positive cache entry check indication. The transaction is then propagated at step S307. If the transaction does not have a positive security check indication at step S306 then at step S310 the security checking procedure is performed. If the security checking procedure passes, then the cache entry check indication and the security check indication of the transaction are updated to show positive indications at step S311. The transaction is then propagated at step S307. If the security checking procedure fails at step S310, then at step S312 an error is signalled.

FIG. 12B shows a table of possible outcomes for the method illustrated in FIG. 12A. If both the transaction security checking indication and the cache entry check indication are unknown, then the security checking procedure is performed. If this passes, the cache entry and the transaction are marked with a positive indication, and the transaction propagates. If the security checking procedure fails, then an error is signalled. If the transaction security check indication is positive and the cache entry check indication is unknown, the cache is updated to a positive indication. If the cache entry check indication is positive and the transaction security indication is unknown, then the transaction is updated to have a positive security check indication. If both the transaction security check indication and the cache entry check indication are positive, then no security check needs to be performed.

Figure 13:
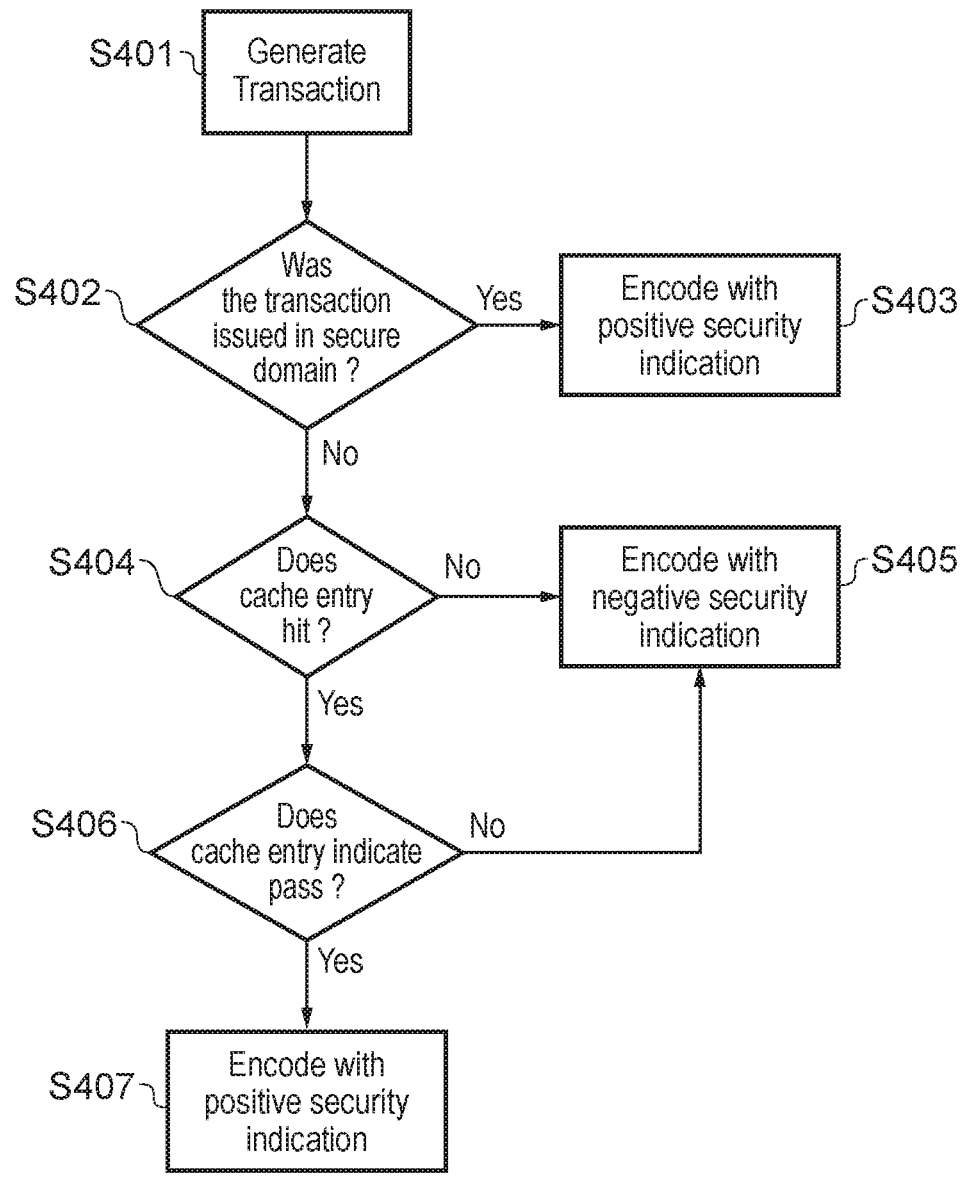
FIG. 13 shows a flow diagram illustrating steps in a method for a master device including generating memory access transactions and comparing a transaction with a cache entry.

FIG. 13 shows a flow diagram illustrating steps in a method performed at a master device for generating memory access transactions including comparing a transactions with a cache entry. In this example, the transactions issued in the secure domain are able to access both secure and non-secure regions of memory. At step S401 the transaction is generated, and at step S402 a determination is made as to whether the transaction was generated in a secure domain. If it was, then at step S403 the transaction is encoded with a positive security indication. If applied to a system wherein transactions issued in the secure domain can only access secure memory regions, steps S402 and S403 are omitted.

If it was not issued in a secure domain at step S402 then at step S404 a determination is made as to whether the combination of issuing domain and target address hits in a cache. If it does not, the method proceeds to step S405 and the transaction is encoded with an unknown security check indication. If the cache entry does hit, then at step S406 it is determined whether the cache entry indicates that a transaction with the same combination of issuing domain and target address would pass the security checking procedure. If it would, then the transaction is encoded with a positive security indication at step S407. If the cache entry indicates a negative security indication, the transaction is encoded with an unknown security check indication at step S405.

A brief summary of an example of the present technology is provided below.

The Arm® TrustZone® architecture is an example of an architecture that provides for separate Secure and Non-secure memory spaces. However, it assumes that Secure and Non-secure memory is physically distinct, whereas a number of usage models benefit from being able to dynamically assign DRAM pages as owned by either the Secure or Non-secure domains.

Dynamically moving DRAM pages between Secure and Non-secure domains creates a Point of Physical Alias (PoPA). Upstream of the PoPA, the two domains are disjoint and cached separately; downstream they alias onto the same set of physical DRAM pages.

The PoPA manages a check to see whether the page is secure or non-secure. This can require looking in structures in memory. This lookup can take some time, and requires a cache to store recently fetched entries. Some CPUs or devices, particularly those with specific performance requirements and/or those with large working sets, might benefit from performing the check before the transaction enters the main coherent interconnect.

The present technology provides a transaction that, when it is presented to the interconnect, is flagged to indicate whether the security check has already been performed. If true, then accesses to DRAM can ignore the security domain associated with the transaction. If false, then before DRAM is accessed, the downstream interconnect must ensure that the page is owned by the security domain being used for the access.

An example coherence protocol is as follows:
  Transactions accessing different security domains are always kept separate. The security domain functions as an address bit.
  When a non-security-checked transaction hits a cache line which is marked as security-checked, it is treated as if it is a security-checked transaction, because the presence of that security-checked cache line indicates that the page is known to be owned by the corresponding security domain.
  When a security-checked transaction hits a cache line which is marked as non-security-checked, the cache line can be marked as security-checked.

The process of reassigning a page from one security domain to another may include explicit cache cleaning operations and zeroing of the data in the page, so that the physical alias is not visible to software.

This example has been described for two security domains, but is extensible to more than two security domains.

When one security domain is more secure than another, then checking might not always be required. For example, when using a Secure domain and a Non-secure domain, it might not be necessary to check that Secure transactions access pages owned by the Secure domain, because Secure transactions are trusted. This means that the "Secure, non-security-checked" combination might not need to be supported.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. A memory system component comprising:
transaction handling circuitry to receive memory access transactions, each memory access transaction specifying at least:
an issuing domain identifier which indicates an issuing security domain specified by an issuing master device for the memory access transaction, where the issuing security domain is one of a plurality of security domains;
a target address; and
a security check indication which indicates whether it is already known that the memory access transaction would pass a security checking procedure;
where said security checking procedure is for determining whether the memory access transaction indicating said issuing security domain is authorised to access the target address, based on control data indicative of which of the plurality of security domains are allowed to access the target address; and
the memory system component comprises control circuitry to determine, based on the security check indication, whether the security checking procedure still needs to be performed;
wherein the memory access transaction supports a plurality of encodings including at least:
a first encoding specifying a given value for the issuing domain identifier and a first value for the security check indication indicating that it is already known that the memory access transaction would pass the security checking procedure; and
a second encoding specifying said given value for the issuing domain identifier and a second value for the security check indication indicating that it is not already known whether the memory access transaction would pass or fail the security checking procedure.

2. The memory system component according to claim 1, wherein when the control circuitry determines that the security checking procedure still needs to be performed, the control circuitry is configured to control security checking circuitry to perform the security checking procedure.

3. The memory system component according to claim 2, wherein the memory system component comprises the security checking circuitry.

4. The memory system component of claim 3, wherein when a given memory access transaction fails the security checking procedure, the security checking circuitry is configured to signal an error and to prevent the given memory access transaction from propagating downstream of the memory system component.

5. The memory system component according to claim 1, wherein when the control circuitry determines that the security checking procedure still needs to be performed, the control circuitry is configured to control downstream security checking circuitry to perform the security checking procedure.

6. The memory system component according to claim 1, wherein the target address is a physical address.

7. The memory system component according to claim 1, wherein the control data comprises a number of entries, each associating at least one region of address space with at least one of the plurality of security domains.

8. The memory system component according to claim 7, wherein the security checking procedure includes comparing the issuing domain identifier with the at least one of the plurality of security domains associated with a region of address space including the target address.

9. The memory system component according to claim 1, wherein the plurality of domains includes at least a secure domain and a less secure domain.

10. The memory system component according to claim 9, wherein the memory access transaction supports an encoding which indicates that the issuing security domain is the less secure domain and the transaction is known to pass the security checking procedure.

11. The memory system component according to claim 1, comprising a cache comprising cache entries to cache data obtained in response to previously received memory access transactions, each cache entry indexed by a combination of the target address and issuing security domain.

12. A memory system component comprising:
transaction handling circuitry to receive memory access transactions, each memory access transaction specifying at least:
an issuing domain identifier which indicates an issuing security domain specified by an issuing master device for the memory access transaction, where the issuing security domain is one of a plurality of security domains;
a target address; and
a security check indication which indicates whether it is already known that the memory access transaction would pass a security checking procedure;
where said security checking procedure is for determining whether the memory access transaction indicating said issuing security domain is authorised to access the target address, based on control data indicative of which of the plurality of security domains are allowed to access the target address; and
the memory system component comprises control circuitry to determine, based on the security check indication, whether the security checking procedure still needs to be performed;
a cache comprising cache entries to cache data obtained in response to previously received memory access transactions, each cache entry indexed by a combination of the target address and issuing security domain,
wherein the cache entries are configured to store at least a cache entry check indicator indicating whether the security checking procedure would be passed for a corresponding combination of the target address and the issuing security domain; and
the control circuitry is configured to determine whether the security checking procedure still needs to be performed for a given memory access transaction, on the basis of the security check indication specified by the given memory access transaction and the cache entry check indicator of a cache entry corresponding to the combination of the target address and the issuing security domain for the given memory access transaction.

13. The memory system component of claim 12, wherein when the cache entry check indicator indicates that the security checking procedure would be passed for a given combination of the target address and the issuing security domain specified by the given memory access transaction, the control circuitry determines that the security checking procedure does not need to be performed for the given memory transaction, even if the security check indication specified by the given memory access transaction indicates that it is unknown whether the security checking procedure would be passed for the given memory access transaction.

14. The memory system component of according to claim 12, wherein when the security check indication for the given memory access transaction indicates that the given memory access transaction would pass the security checking procedure, and the cache entry check indicator does not indicate that the security checking procedure would be passed for a given combination of the target address and the issuing security domain, the cache is configured to update the cache entry check indicator to indicate that the security checking procedure would be passed for the given combination of target address and issuing security domain.

15. A master device comprising:
transaction issuing circuitry to issue memory access transactions; and
encoding circuitry to encode each memory access transaction with an encoding specifying at least:
an issuing domain identifier which indicates an issuing security domain specified for the memory access transaction, where the issuing security domain is one of a plurality of security domains;
a target address; and
a security check indication which indicates whether it is already known that the memory access transaction would pass a security checking procedure;
where said security checking procedure is for determining whether the memory access transaction indicating said issuing security domain is authorised to access the target address, based on control data indicative of which of the plurality of security domains are allowed to access the target address;
wherein the memory access transaction supports a plurality of encodings including at least:
a first encoding specifying a given value for the issuing domain identifier and a first value for the security check indication indicating that it is already known that the memory access transaction would pass the security checking procedure; and
a second encoding specifying said given value for the issuing domain identifier and a second value for the security check indication indicating that it is not already know whether the memory access transaction would pass or fail the security checking procedure.

16. The master device according to claim 15, comprising:
security checking circuitry to perform the security checking procedure; and
determination circuitry to determine whether or not the security checking procedure should be performed;
wherein the encoding circuitry is configured to set the security check indication based on the determination made by the determination circuitry.

17. The master device according to claim 16, wherein the determination circuitry is configured to make the determination based on at least one of:
the issuing security domain, and
whether the memory access transaction encountered a miss in a given level of cache, where said cache is one of:
a data cache; and
a control data cache to cache said control data indicative of which of the security domains are allowed to access the target address.

18. A system comprising:
the master device according to claim 15; and
a memory system component comprising:
transaction handling circuitry to receive the memory access transactions issued by the transaction issuing circuitry of the master device; and
control circuitry to determine, based on the security check indication, whether the security checking procedure still needs to be performed.

* * * * *